United States Patent
Allen et al.

[15] 3,642,435
[45] Feb. 15, 1972

[54] METHOD OF RECOVERING WATER-SOLUBLE NONFERROUS METAL SULFATES FROM SULFUR-BEARING ORES

[72] Inventors: Eugene S. Allen, Santa Monica, Calif.; Royce S. Gavrias, Skouriotissa, Cyprus

[73] Assignee: Cyprus Mines Corporation, Los Angeles, Calif.

[22] Filed: Nov. 10, 1969

[21] Appl. No.: 875,256

[52] U.S. Cl. .................................. 23/117, 23/125, 23/126, 75/115
[51] Int. Cl. ........................................ C01g 1/10, C01g 3/10
[58] Field of Search ...................... 23/117, 125, 126; 75/115

[56] References Cited

UNITED STATES PATENTS

| | | | |
|---|---|---|---|
| 3,174,849 | 3/1965 | Mackin et al. | 75/115 |
| 3,186,942 | 6/1965 | Benger | 23/117 X |
| 3,529,957 | 9/1970 | Kunda et al. | 23/126 X |

FOREIGN PATENTS OR APPLICATIONS

| | | | |
|---|---|---|---|
| 51,485 | 12/1955 | Canada | 23/117 |
| 626,607 | 8/1961 | Canada | 23/125 |

*Primary Examiner*—Edward Stern
*Attorney*—Harris, Kiech, Russell & Kern

[57] ABSTRACT

Ore with a relatively high sulfur content, containing various amounts of ferrous and nonferrous sulfides, and particularly a relatively small amount of copper sulfide, is subjected to a controlled oxidation leach in an aqueous medium at elevated temperatures and pressures, to convert the nonferrous sulfides into water-soluble sulfates with only slight concomitant oxidation of the ferrous sulfides.

12 Claims, 2 Drawing Figures

METHOD OF RECOVERING WATER-SOLUBLE NONFERROUS METAL SULFATES FROM SULFUR-BEARING ORES

BACKGROUND OF THE INVENTION

Such useful or desirable nonferrous metals as copper, nickel and cobalt, as well as cadmium, lead, gold, silver and zinc, frequently occur as sulfide ores in nature. Unfortunately, they seldom occur alone or in desirably high concentrations. Usually they occur in combinations with each other or with arsenides or as sulfur-arsenic minerals, together with diluent metal minerals such as those of iron sulfides and with various useless or inert gangue materials. Industrially, then, such ores present not only the problems of removing gangue and diluent minerals to raise the grade, but also those of recovering the metal values from the ore concentrates and separating these values from each other.

Heretofore, the most important conventional processes of recovering copper, nickel, cobalt and zinc values, for example, from their sulfide ores have involved many steps. Usually the valuable sulfides in the ore must be freed of gangue and from each other, as by gravity separation, froth flotation, or the like. This may be followed by additional regrinding to further separate the sulfide minerals from each other by additional froth flotation steps and/or this may be followed by pyrometallurgical processes by roasting the concentrate to remove volatile oxides and some sulfur, adding silica and calcium carbonate to the roasted ore, and heating the mixture in a reverberatory furnace to form a sulfide "matte." This "matte" is then oxidized to metal, as for example in a special Bessemer-type converter to obtain a crude bullion of mixed metals which is usually cast into cakes or anodes and dissolved electrolytically in an acid electrolyte, i.e., sulfuric acid. Further separation and recovery of the metals involves chemical purification of the electrolyte and removal and retreatment or purification of the different metals by various methods.

The desirability of a more direct method of extracting nonferrous metals from their ores, concentrates and concentrator products without smelting has long been recognized. Leaching followed by chemical precipitation appears to offer one solution and many attempts have been made to achieve this result. In general, these attempts have failed to receive commercial acceptance for various reasons. For example, most metallic sulfides present in the concentrates are not directly soluble in water or in any other commercially practical solvent, by conventional methods. As another example, the massive sulfide concentrates and/or other concentrator products containing economic but lesser contents of copper sulfide values with iron sulfides as the diluent may be valuable in certain locations as sulfur-containing byproducts, and can be sold for its sulfur content. In the latter example, it is desirable to retain the iron sulfide mineral, pyrite, because it can be marketed for the production of sulfuric acid.

Selective flotation separations of the nonferrous metal sulfides values from the iron sulfides have been advanced as a solution. However, such separations are dependent upon grinding of the material to free the metal sulfides from each other. It frequently occurs that the nonferrous metal sulfides and the iron sulfide minerals are so intimately associated and very finely dispersed that it is uneconomical to grind the material to the fineness required to free the sulfide minerals from each other for separation by selective flotation processes. The association of the nonferrous metal sulfides and the iron sulfide minerals may be so finely dispersed that the inclusions of one sulfide mineral within another sulfide mineral may be considered as "solid solution."

Recently, processes have been developed for directly leaching the ferrous and nonferrous sulfide ores, ore concentrates, and other concentrator metal sulfide products to dissolve certain of the nonferrous sulfide minerals by decomposition. The process invented for recovery of copper from ferrous sulfides requires an oxidation step requiring the addition of oxygen, or air, under pressure and at elevated temperatures. For example, Canadian Pat. No. 712,989, issued July 6, 1965, to Vladimir N. Mackin and Herbert Veltman discloses a method of leaching copper sulfate bearing pyrite ore in an aqueous acid solution which contains a sufficient amount of sulfuric acid to combine with the copper values present at elevated temperatures in the presence of free oxygen to convert the copper sulfides into soluble copper values and elementary sulfur with little conversion of the pyrite. This leaching method is disadvantageous in that it (1) requires the addition of sulfuric acid to the leaching solution, (2) converts the sulfide sulfur from the copper sulfide to elementary sulfur which contaminates the pyrite, and (3) for every mole of copper sulfide converted into soluble copper values a mole of sulfuric acid is produced and thereby increases the sulfuric acid content of the leaching solution which increases the solubility of pyrite and other iron salts into solution to further contaminate the copper containing leaching solution. When treating a metal sulfide concentrate, ore and/or other concentrator sulfide product, the resultant production of soluble iron sulfates and excess sulfuric acid serves no useful purpose after reaching certain optimum concentrations or iron sulfates and excess sulfuric acid in the leaching solution. Excessive concentrations of the soluble iron salts and sulfuric acid in the leach liquor not only dilutes and contaminates the solution containing soluble nonferrous metal values but also increases the consumption of pressurized air or oxygen which is consumed in their production. Pumping and pressurizing air or oxygen is an expensive operation, which undesirably increases the cost of producing the desired metals. For the recovery of copper, from the leach solution, by precipitation, employing metallic iron as the precipitant, excessive quantities of soluble iron salts and sulfuric acid also increases the consumption of the precipitant, metallic iron, resulting in the further increasing of the cost of producing the copper metal. British Pats. Nos. 760,624 (published Nov. 7, 1956) and 801,403 (published Sept. 10, 1958) to Chemical Construction Corp. disclose other acid leaching methods conducted at elevated temperatures in the presence of oxygen that convert pyrite to iron oxide, sulfide sulfur to elementary sulfur and a portion of the nonferrous mineral sulfides to soluble nonferrous metal values. These methods are disadvantageous in that they (1) require the addition of sulfuric acid to the leaching solution, (2) convert the pyrite to iron oxide which cannot be sold for sulfuric acid production, and (3) convert the sulfide sulfur to elemental sulfur which occludes some of the nonferrous mineral sulfides and contaminates the iron oxide. The production of iron oxide or elementary sulfur serves no useful purpose in the conversion of insoluble copper sulfides to soluble copper values. Elemental sulfur has the tendency to form globules that occulate copper sulfides solids which prevents conversion of the copper sulfides, and the production of iron oxide from pyrite requires a large expenditure of pressurized oxygen which increases production costs of the soluble copper values.

The present invention overcomes many of the disadvantages of the prior art leaching processes. The present method provides a method of recovering over 90 percent of the water-insoluble, nonferrous metal values in pyrite ore with minimum (1) conversion of pyrite, (2) formation of sulfuric acid, and (3) formation of elemental sulfur. Furthermore, the present method does not require the addition of acid, such as sulfuric acid, to the leaching solution or bath.

SUMMARY

The present invention is a method of selectively recovering soluble nonferrous metal sulfates from sulfur-bearing pyrite ores by preparing an aqueous slurry from water and finely divided sulfur-bearing pyrite ore containing water-insoluble nonferrous metal sulfides, and by heating the resulting slurry and passing an oxygen-containing gas through the slurry at above atmospheric pressure to convert the nonferrous metal sulfides into water-soluble nonferrous metal sulfates and to produce some sulfuric acid and ferric sulfate.

The principal object of the present invention is to provide a selective leaching method for sulfur-bearing pyrite ore containing nonferrous metal sulfides which (1) permits recovery of over 90 percent of the nonferrous metal values, (2) does not require acidification or the addition of sulfuric acid to leaching solution, (3) minimizes conversion of pyrite to soluble iron salts, (4) minimizes the production of elemental sulfur, and (5) minimizes the production of sulfuric acid and ferric sulfate, whereby their concentration in the leaching solution is controlled.

DESCRIPTION OF THE PREFERRED EMBODIMENT

Figure 1:
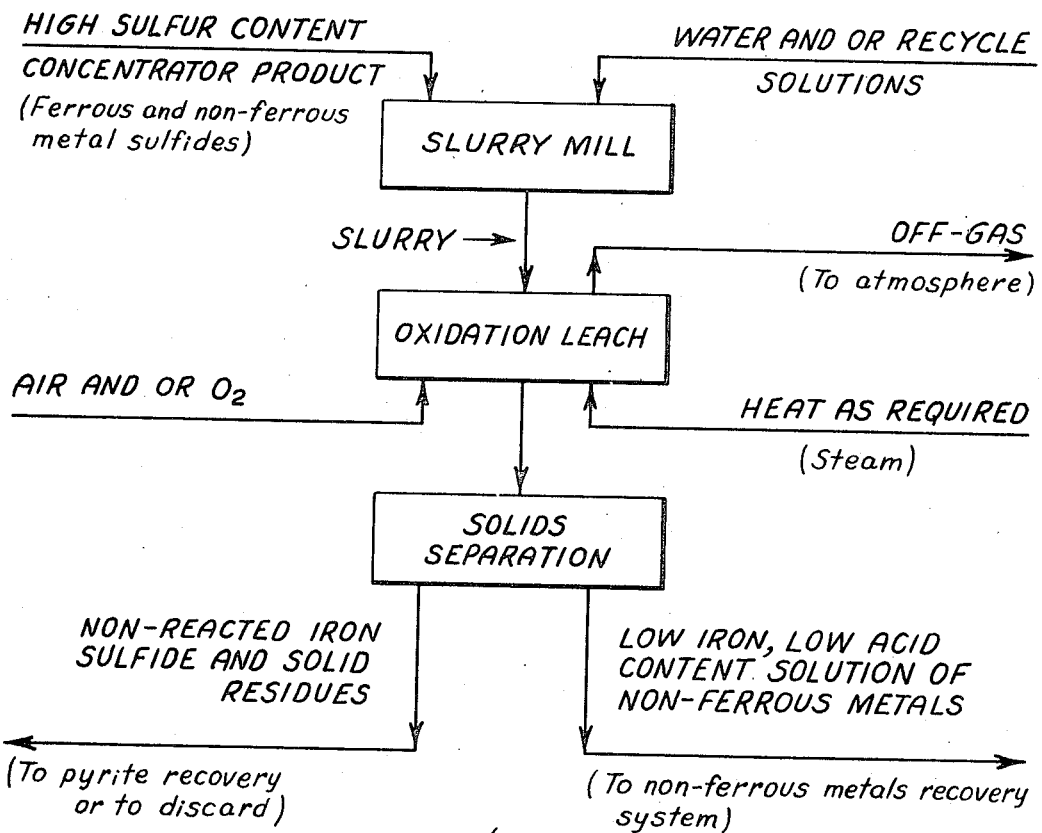
FIG. 1 is a schematic flow sheet illustrating the novel method which is the subject matter of the present invention.

Although the present method can be practiced on a whole ore, such a process would be wasteful of apparatus capacity and hence would be uneconomical. Usually, the feed material to be leached will be either a very high grade concentrate or an intermediate concentrator product of relatively high sulfur content and containing nonferrous metal values which can be economically recovered. The concentrator product can be a byproduct obtained by gravity separation, by sizing separation, or by flotation separation from other processes for other purposes. One such byproduct which has been successfully used as a feed material in the present process is slime tailings of substantially all −325 mesh which assays from about 0.60 percent to about 1.2 percent copper and about 35 percent sulfur values, such as sulfide sulfur and sulfate sulfur. In such slime tailings the copper is mainly in mineral form as chalcocite, i.e., cuperous sulfite, and is also contained in the pyrite.

During the subsequent oxidation leaching there must be available an amount of sulfate sulfur, as ferric sulfate, stoichiometrically equivalent to the amount of nonferrous metals in order to form sulfates of the nonferrous metal values. It is also necessary to have available a sufficient amount of sulfide sulfur as pyrite to maintain an adequate concentration of ferric sulfate to oxidize the nonferrous sulfides and of sulfuric acid to oxidize the ferrous sulfate to ferric sulfate and to dissolve the nonferrous metal values. A high concentration of sulfuric acid in the leaching solution should be avoided because it reduces the solubility of the soluble nonferrous metal sulfates in the leaching liquor and increases the solubility of the iron and other contaminates. Considered from a commercial standpoint, viz the consumption of iron during the precipitation of copper, a sulfuric acid concentration above 50 grams per liter after oxidation should be avoided. In like manner, any amount of ferric sulfate above 50 grams per liter is undesirable.

It has been determined that to produce the required chemical reactions, the sulfur values content as percent sulfur of the feed material should be at least 6 percent by weight, preferably in excess of 7 percent. If the sulfur values content of the feed material is not sufficient to produce the desired concentrations in the leach solution, additional sulfur can be introduced in the form of elemental sulfur, pyrite sulfide sulfur, dilute sulfuric acid, or recycle solutions containing relatively high concentrations of water-soluble sulfates such as ferrous sulfate.

The feed material, that is the sulfur-bearing pyrite ore, is processed in a conventional slurry mill at from about 25 percent to about 50 percent solids, preferably about 25 to about 30 percent solids, and is then transferred to rubber-lined preheat tanks where it is heated to a temperature between 150° F. and 200° F., preferably to about 180° F., under atmospheric pressure. The aforementioned density of the slurry is preferred for both metallurgical and economical reasons. Although some increased extraction occurs at lower slurry densities, lower slurry densities result in lower plant capacity or require more expensive equipment and machinery to handle the increased equivalent tonnage as the density is decreased.

The preheated slurry is then pumped into rubber-lined autoclaves operating at an elevated pressure between 60 and 125 p.s.i.g., preferably at about 90 p.s.i.g. (oxygen partial pressure of 22.5 lb./sq. in.), for the oxidation leaching.

Figure 2:
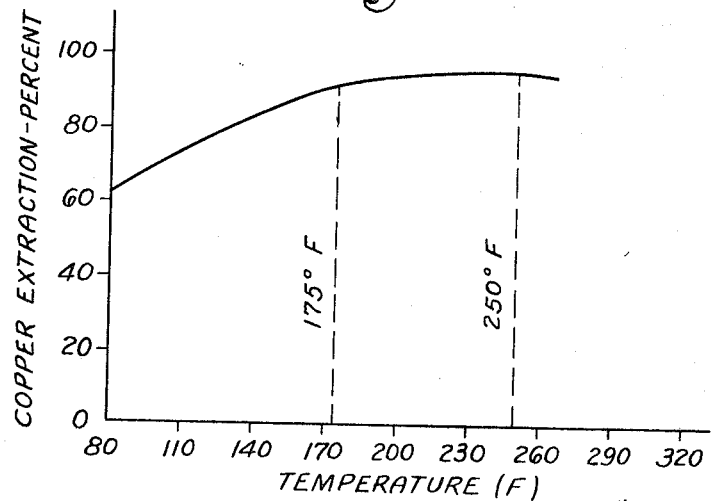
FIG. 2 is a curve illustrating the change in copper extraction with the change in the temperature of the leach.

Leaching operations are carried out at a temperature between about 175° F. and about 250° F. As shown in FIG. 2, the extraction starts to peak at about 175° F. and starts to decrease at about 250° F. Approximately 180° F. is an optimum temperature because at this temperature the chalcocite (cuperous sulfide material) is dissolved, the percentage of copper extraction is close to the maximum, and the power consumption for heating is minimized.

In an oxidizing leach of the present type, air is the most practical oxidizing agent. The air, and therefore the oxygen contained therein, can be supplied to the slurry most effectively by subsurface injection of the air with mechanical dispersion of the gases in the slurry.

The quantity of oxygen is relatively critical to controlling the amount of oxidation required for the operation, and therefore the air is metered into the heated pressurized slurry at a rate of more than about 100 standard cubic feet per minute per 1,000 cubic feet of slurry, a rate of about 170 standard cubic feet per minute has been found to give excellent results. Because the air contains inert gases such as nitrogen, the off gas must be bled off at approximately the same rate to prevent the autoclave atmosphere from becoming depleted of oxygen.

Somewhat lower oxygen contents can be maintained but the treatment time is correspondingly prolonged. Although there is a corresponding increase in the efficiency of oxygen utilization at lower oxygen contents in the autoclave atmosphere, the necessary increase in apparatus requirements at such lower oxygen contents offsets any savings therefrom.

Higher oxygen partial pressures can be produced by using increased amounts of air with the accompanying increase in power and apparatus costs, or by increasing the bleed rate with an accompanying drop in the efficiency of oxygen utilization. Also, although higher oxygen partial pressures would decrease the retention time for the chemical reactions, the resulting increased consumption of iron and production of sulfuric acid and ferric sulfate would result in higher precipitation costs, greater contamination of the slurry or leaching solution, and wasteful consumption of pyrite. Higher pressures would also require more expensive autoclaves to withstand the increased pressure and more corrosive solutions.

The oxidative leaching is conducted for a sufficient period to allow the leaching of the nonferrous metal value to be substantially complete; that is, the leaching is preferably continued until at least 90 percent of the nonferrous metal values are converted into soluble values. Generally the oxidative leaching is conducted for at least a 2-hour period, preferably for at least a 3-hour period. Rarely does the leaching process require a period in excess of 10 hours.

Of course, some variation in the aforementioned operating conditions may be indicated by variations in the contents of the feed material. In this regard, the temperature of the leaching operation, the amount of oxygen which is being introduced and the leaching time can be varied to achieve the objects of the present invention.

The object of the process is to extract and recover the nonferrous metal values contained in the feed material, particularly copper, at the greatest economic return. Generally speaking, this requires adjusting the operating conditions to limit the formation of soluble iron salts, such as ferrous and ferric sulfate, and to limit the formation of excess sulfuric acid.

Although slightly additional recoveries of nonferrous metals are achieved when high concentrations of ferric sulfate and sulfuric acid are present in the solution, excess amounts of ferric sulfate and sulfuric acid consume the pyrite to form soluble iron salts and elementary sulfur, and thereby reduce the amount of pyrite thereof available for sale. Ferric sulfate and sulfuric acid also consume greater quantities of precipitating reagents (such as scrap iron) during the recovery of the nonferrous metals from the pregnant leaching liquor, thereby increasing the cost of the nonferrous metal recovery.

At the end of the required residence time, the slurry is cooled, filtered, and the solid residue washed with water. The solids, containing most of the iron values, are removed from the system after the washing. As noted above, after proper selective leaching, much of the iron will remain as iron sulfide in the insoluble residue. The sulfur content can be upgraded into a salable sulfur-bearing byproduct by some ancillary process which forms no part of the preset invention.

The pregnant liquor and the wash water, containing the nonferrous metals as dissolved sulfates, is sent to a suitable recovery system which also forms no part of the present invention.

Set forth below are several examples which are illustrative of the present process.

EXAMPLE 1

Samples having the following listed physical characteristics and copper and sulfur contents were treated as follows:

| Sample Description | Density % Solids | Assays % Cu | % S |
|---|---|---|---|
| No. 1 Leaching Classifier O' flow | 26.8 | 2.47 | 28.02 |
| Wet Tails Plant Classifier O' flow | 26.6 | 1.52 | 36.75 |
| Composite Sample | 26.7 | 1.97 | 32.36 |

The composite sample portions were aqueous slurries. The composite slurry was transferred to a stirred autoclave, heated to 250° F. and subjected to a pressure of 90 p.s.i.g. with air at approximately 170 cubic feet per minute per 1,000 cubic feet of slurry. These conditions were maintained for 3 hours. At the termination of the leaching period the slurry was cooled, filtered and washed with tap water. The filtrate with the included wash water and the solids residue were analyzed.

The results were as follows:

| Test Feed Assay | Example 1 |
|---|---|
| % Cu | 1.97 |
| % S | 32.36 |
| Test Residue Assay | |
| % Cu | 0.21 |
| % S | 35.35 |
| Leach Solution Assay | Example 1 |
| Cu grams per liter (gpl) | 5.02 |
| $H_2SO_4$-gpl | 12.50 |
| $Fe^{++}$-gpl | 10.30 |
| $Fe^{+++}$-gpl | 8.38 |
| Recovery | |
| Copper in solution | 92.2% |
| Sulfur in residue | 85.0% |

EXAMPLE 2

A composite sample of slime tailings from various disposal ponds was prepared and analyzed as follows:

| Sample R-548 | |
|---|---|
| Total copper | 1.53% |
| Water-soluble copper | 0.32% |
| Total Sulfur | 36.84% |
| Total iron | 35.05% |
| Moisture content | 11.17% |

The sample was slurried with tap water from the laboratory to produce a slurry containing 27 percent solids. The slurry was transferred to a laboratory autoclave and subjected to leaching under the following conditions:

| | |
|---|---|
| Temperature | 170° F. |
| Pressure | 90 p.s.i.g. |
| Retention time | 3 hours |
| Off-gas rate | 170 c.f.m. per 1000 CF slurry |

The results were as follows:

| Test Feed Assay | Example 2 |
|---|---|
| % Cu | 1.53 |
| % S | 36.84 |
| Test Residue Assay | |
| % Cu | 0.12 |
| % S | 38.21 |
| Leach Solution Assay | |
| Cu-gpl | 2.88 |
| $H_2SO_4$-gpl | 3.30 |
| $Fe^{++}$-gpl | 5.05 |
| $Fe^{+++}$-gpl | 1.76 |
| Recovery | |
| Copper in solution | 93.0% |
| Sulfur in residue | 88.5% |

EXAMPLE 3

A grab sample of the mill tails (copper flotation tailings) analyzed 0.43 percent copper and 43.47 percent sulfur. This material was subjected to a pressure leach under the following test conditions:

| | |
|---|---|
| Pulp density | 30% solids |
| Pressure | 90 p.s.i.g. |
| Temperature | 230° F. |
| Retention time | 5 hours |
| Off-gas rate | 170 c.f.m. per 1000 CF slurry |

The results of this test were as follows:

| Test Feed Assay | Example 3 |
|---|---|
| % Cu | 0.43 |
| % S | 43.47 |
| Test Residue Assay | |
| % Cu | 0.09 |
| % S | 40.38 |
| Leach Solution Assay | |
| Cu-gpl | 0.44 |
| $H_2SO_4$-gpl | 2.65 |
| $Fe^{++}$-gpl | 4.25 |
| $Fe^{+++}$-gpl | 2.45 |
| Recovery | |
| Copper in solution | 77.7% |

EXAMPLE 4

A composite sample of slime tailings, analyzing as follows total copper 1.15 percent and water-soluble copper 0.35 percent, was mixed with water to produce a slurry containing 26.3 percent solids. The slurry was transferred to the laboratory autoclave and subject to leaching under the following conditions:

| | |
|---|---|
| Temperature | 167°–176° F. |
| Pressure | 125 p.s.i.g. |
| Retention time | 3 hrs. |
| Off-gas rate | 150 c.f.m. per 1000 CF slurry |

The results were as follows:

| Test Feed Assay | Example 4 |
|---|---|
| % Cu | 1.15% |
| % S | >6.0% |

| Test Residue Assay | |
|---|---|
| % Cu | 0.17% |
| Leach Solution Assay | |
| Cu-gpl | 3.79 |
| $Fe^{+2}$-gpl | 13.3 |
| $Fe^{+3}$-gpl | 0.5 |
| Recovery | |
| Copper in solution | 86.0% |

EXAMPLE 5

A composite sample of slime tailings, analyzing as follows total copper 1.02 percent and water-soluble copper 0.34 percent, was slurried with an aqueous solution containing 19 grams of ferrous sulfate per liter to produce a slurry containing 26.8 percent solids and sulfur values, as percent sulfur, in excess of 7 percent by weight. The slurry was transferred to a laboratory autoclave and subjected to leaching under the following conditions:

| | |
|---|---|
| Temperature | 230°–239° F. |
| Pressure | 90 p.s.i.g. |
| Retention time | 3 hours |
| Off-gas rate | 200 c.f.m. per 1000 CF slurry |

The results were analyzed as follows:

| Test Feed Assay | Example 5 |
|---|---|
| % Cu | 1.15% |
| Test Residue Assay | |
| % Cu | 0.14% |
| Leach Solution Assay | |
| Cu-gpl | 3.93 |
| $Fe^{+2}$-gpl | 18.0 |
| $Fe^{+3}$-gpl | 5.7 |
| Recovery | |
| Copper in solution | 89.0% |

EXAMPLE 6

A composite sample of slime tailings containing sulfur values, as percent sulfur, in excess of 30 percent by weight, analyzing as follows total copper 1.06 percent and water-soluble copper 0.32 percent was slurried with water to produce a slurry containing 28.2 percent solids. The slurry was transferred to a laboratory autoclave and subjected to leaching under the following conditions:

| | |
|---|---|
| Temperature | 232°–248° F. |
| Pressure | 90 p.s.i.g. |
| Retention time | 3 hours |
| Off-gas rate | 200 c.f.m. per 1000 CF slurry |

The results were as follows:

| Test Feed Assay | Example 6 |
|---|---|
| % Cu | 1.06% |
| Test Residue Assay | |
| % Cu | 0.075% |
| Leach Solution Assay | |
| Cu-gpl | 4.82 |
| $H_2SO_4$-gpl | 11.5 |
| $Fe^{+2}$-gpl | 17.0 |
| $Fe^{+3}$-gpl | 3.3 |
| Recovery | |
| Copper in solution | 94.0% |

EXAMPLE 7

Composite samples of slime tailings containing sulfur values, as per cent sulfur, in excess of 30 percent by weight were slurried with water to produce slurries containing 27 percent solids. The slurries were transferred to laboratory autoclaves and subjected to leaching under the following conditions:

| | Sample A | Sample B |
|---|---|---|
| Temperature | 244° F. | 170° F. |
| Pressure | 90 p.s.i.g. | 90 p.s.i.g. |
| Retention time | 3 hrs. | 3 hrs |
| Off-gas rate (c.f.m. per 1000 CF slurry) | 200 | 200 |

The results and analysis were as follows:

| Test Feed Assay | Sample A | Sample B |
|---|---|---|
| % Cu | 1.15 | 1.06 |
| % water-soluble Cu | 0.10 | 0.095 |
| Test Residue Assay | | |
| % Cu | 0.63 | 0.20 |
| Leach Solution Assay | | |
| Cu-gpl | 1.88 | 3.34 |
| $H_2SO_4$-gpl | — | 1.7 |
| $Fe^{+2}$-gpl | 9.74 | 6.44 |
| $Fe^{+3}$-gpl | <0.6 | 0.5 |
| Recovery | | |
| % Copper in solution | 51.0 | 84.0 |

The above results illustrate that process temperatures around 250° F. have an effect of reducing the yield of soluble nonferrous metals, such as copper.

EXAMPLE 8

Composite samples of nonferrous metal containing pyrite slime tailings were slurried with water to produce slimes containing 27 percent solids. The slurries were transferred to laboratory autoclaves and subjected to agitated leaching under the following conditions:

| | Sample C | Sample D | Sample E |
|---|---|---|---|
| Temperature | 158°–172° F. | 158°–174° F. | 158°–174° F. |
| Pressure | 90 p.s.i.g. | 90 p.s.i.g. | 90 p.s.i.g. |
| Retention time | 3 hrs. | 6 hrs. | 5.5 hrs. |
| Off-gas rate (c.f.m. per 1000 CF slurry) | 200 | 200 | 200 |

The comparative results were as follows:

| Test Feed Assay | Sample C | Sample D | Sample E |
|---|---|---|---|
| % Cu | 1.06 | 1.17 | 1.17 |
| % water-soluble Cu | 0.095 | 0.13 | 0.22 |
| Test Residue Assay | | | |
| % Cu | 0.20 | 0.11 | 0.13 |
| Leach Solution Assay | | | |
| Cu-gpl | 3.34 | 3.97 | 3.41 |
| $H_2SO_4$-gpl | 1.7 | — | — |
| $Fe^{+2}$-gpl | 6.44 | 6.50 | 5.66 |
| $Fe^{+3}$-gpl | 0.5 | 1.0 | 1.2 |
| Recovery | | | |
| % Copper in solution | 84.0 | 91.0 | 89.0 |

The above test results show that leaching or retention times that exceed three hours under the above operating conditions do not offer commercial or economic advantages over the 3-hour leach when considering the power expenditure for the air supply and heat.

We claim:

1. The method of selectively recovering soluble nonferrous metal sulfates from sulfur-bearing pyrite ores with a minimal conversion of the pyrite and production of elemental sulfur, sulfuric acid and soluble iron sulfate values, which includes the steps of:

providing an aqueous slurry by mixing water and finely divided sulfur-bearing pyrite ore containing nonferrous metal sulfides, the slurry containing a sufficient amount of sulfur values to form soluble sulfates of the nonferrous metals;

heating the slurry to a temperature between about 175° and 250° F. and passing an amount of oxygen-containing gas therethrough at an elevated pressure between about 60 and 125 p.s.i.g. for a predetermined period of time to convert the insoluble nonferrous metal sulfides into water-soluble nonferrous metal sulfates and produce sulfuric acid and ferric sulfate, said heated slurry containing sufficient amounts of sulfate sulfur values, as ferric sulfate, to form soluble sulfates of the nonferrous metals, and sufficient amounts of sulfide sulfur values, as pyrite, to maintain an adequate amount of sulfate sulfur, as ferric sulfate; and controlling the amount of oxygen-containing gas passing through the slurry so that the conversion of pyrite is minimized and both the sulfuric acid concentration and the ferric sulfate concentration of the slurry is maintained below 50 grams per liter of slurry.

2. The method defined in claim 1 in which the sulfur values content as percent sulfur of the slurry's solids is at least 6 percent by weight.

3. The method defined in claim 1 in which the solids content of the slurry is between about 25 and about 30 percent.

4. The method defined in claim 1 in which the temperature during the oxidative leaching step is maintained at about 180° F.

5. The method defined in claim 1 in which the oxygen-containing gas is air which is passed through the slurry during the oxidative leaching step at a pressure of about 90 p.s.i.g.

6. The method defined in claim 1 in which the oxygen-containing gas is air which is injected into the slurry below the surface thereof at a rate of about 170 cubic feet per minute per 1,000 cubic feet of slurry.

7. The method defined in claim 6 in which the off gases are bled from the slurry at a rate of about 170 cubic feet per minute per 1,000 cubic feet of slurry.

8. The method defined in claim 1 in which the residence time of the leach is about 3 hours.

9. The method defined in claim 1 in which following the oxidative leaching step the slurry is cooled and filtered; the resulting filtered solid residue is washed with water; and the resulting washings are added to the slurry filtrate.

10. The method of selectively recovering soluble nonferrous metal sulfates from sulfur-bearing pyrite ores with a minimal conversion of the pyrite and production of elemental sulfur, sulfuric acid and soluble iron sulfate values, which includes the steps of:

providing an aqueous slurry by mixing water and finely divided sulfur-bearing pyrite ore which contains nonferrous metal sulfides, the slurry containing a sufficient amount of sulfur values to form soluble sulfates of the nonferrous metals and produce ferric sulfate and sulfuric acid, solids content of the slurry being from about 25 to about 30 percent; and subjecting the slurry to an oxidative leaching step for about 3 hours by heating the slurry to a temperature of from about 175° to about 250° F. and passing air through the slurry under a pressure of about 90 p.s.i.g. so that the nonferrous metal sulfides are converted to soluble nonferrous metal sulfates, the air being injected into the slurry below the surface thereof at the rate of about 170 cubic feet per minute per 1,000 cubic feet of slurry, so that the conversion of pyrite is minimized and the concentration of sulfuric acid and the concentration of ferric sulfate are both maintained below 50 grams per liter of slurry, said heated slurry containing sufficient amounts of sulfate sulfur values, as ferric sulfate, to form soluble sulfates of the nonferrous metals, and sufficient amounts of sulfide sulfur values, as pyrite, to maintain an adequate amount of sulfate sulfur, as ferric sulfate.

11. The method defined in claim 10 in which the sulfur values content, as percent sulfur, of the slurry's solids is at least 6 percent by weight.

12. The method defined in claim 10 in which the off gas is removed at a rate of about 170 cubic feet per minute per 1,000 cubic feet of slurry, during the oxidative leaching step.

* * * * *

PO-1050
(5/69)

UNITED STATES PATENT OFFICE
CERTIFICATE OF CORRECTION

Patent No. 3,642,435          Dated February 15, 1972

Inventor(s) Eugene S. Allen and Royce S. Gavrias

It is certified that error appears in the above-identified patent and that said Letters Patent are hereby corrected as shown below:

FOREIGN PATENTS OR APPLICATIONS, "51,485" (Canada) should be --519,485--.

Column 1, line 66, "association" should be --associations--.

Column 2, line 23, "or" should be --of--.

Column 4, line 9, after "60" insert --psig--.

Column 4, line 63, "variation" should be --variations--.

Column 5, line 19, "preset" should be --present--.

Column 9, line 34, after "25" insert --%--.

Column 10, line 20, after "25" insert --%--.

Column 10, line 25, after "175°" insert --F.--.

Column 10, line 41, "off gas" should be --off-gas--.

Signed and sealed this 21st day of November 1972.

(SEAL)
Attest:

EDWARD M. FLETCHER, JR.
Attesting Officer

ROBERT GOTTSCHALK
Commissioner of Patents